United States Patent
Harmon et al.

(10) Patent No.: US 12,304,431 B2
(45) Date of Patent: May 20, 2025

(54) VEHICLE WITH SELECTIVELY DEPLOYABLE ROOF RAILS

(71) Applicant: Ford Global Technologies, LLC, Dearborn, MI (US)

(72) Inventors: Michael John Harmon, Northville, MI (US); David Brian Glickman, Southfield, MI (US); Stuart C. Salter, White Lake, MI (US); Jeffrey Scott Mayville, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/969,061

(22) Filed: Oct. 19, 2022

(65) Prior Publication Data

US 2024/0131994 A1 Apr. 25, 2024
US 2024/0227684 A9 Jul. 11, 2024

(51) Int. Cl.
*B60R 9/045* (2006.01)
*B60R 9/052* (2006.01)

(52) U.S. Cl.
CPC .............. *B60R 9/045* (2013.01); *B60R 9/052* (2013.01)

(58) Field of Classification Search
CPC ................................ B60R 9/045; B60R 9/052
USPC ........................................................ 224/321
See application file for complete search history.

(56) References Cited

U.S. PATENT DOCUMENTS

| | | | | |
|---|---|---|---|---|
| 5,395,024 A * | 3/1995 | Luchtenberg | ........... | B60R 9/045 224/314 |
| 5,511,709 A | 4/1996 | Fisch | | |
| 6,029,873 A | 2/2000 | Won et al. | | |
| 6,126,220 A * | 10/2000 | Brasher | ................... | B62D 33/08 296/26.05 |
| 6,332,637 B1 * | 12/2001 | Chambers | .............. | B62D 33/08 296/3 |
| 6,769,728 B2 * | 8/2004 | Albaisa | ................... | B60R 9/045 296/210 |
| 6,877,790 B2 * | 4/2005 | Queveau | .................. | B60J 7/028 296/108 |
| 7,118,165 B2 * | 10/2006 | Nelson | ............... | B62D 33/0276 296/183.1 |
| 7,237,824 B2 * | 7/2007 | Dodworth | ................ | B60J 7/028 296/107.2 |
| 7,422,130 B2 * | 9/2008 | Shaukat | .................. | B60R 9/045 224/326 |

(Continued)

FOREIGN PATENT DOCUMENTS

| CN | 101445130 B | 1/2013 |
|---|---|---|
| DE | 102011113753 A1 | 3/2012 |

*Primary Examiner* — Peter N Helvey
(74) *Attorney, Agent, or Firm* — Vichit Chea; Carlson, Gaskey & Olds, P.C.

(57) ABSTRACT

In some aspects, the techniques described herein relate to a motor vehicle assembly, including: a roof including a recess; a rail, wherein the rail is moveable between a retracted position and a deployed position, wherein the rail is at least partially within a recess of the roof in the retracted position, wherein the rail is able to connect to an accessory arranged above the roof in the deployed position; and a joint assembly, wherein the joint assembly is configured to guide movement of the rail between the retracted position and the deployed position, wherein the joint assembly includes a first foot, a second foot, and a slotted track, and wherein the first foot and the second foot are arranged at least partially within the slotted track.

13 Claims, 14 Drawing Sheets

(56) References Cited

U.S. PATENT DOCUMENTS

| | | | | |
|---|---|---|---|---|
| 7,641,249 B2* | 1/2010 | Jung | ............... | B60R 9/04 |
| | | | | 296/210 |
| 7,699,372 B2* | 4/2010 | Adams | ............... | B60R 9/055 |
| | | | | 296/26.07 |
| 8,100,306 B2* | 1/2012 | Gerhardt | ............... | B60R 9/045 |
| | | | | 224/539 |
| 8,167,179 B2* | 5/2012 | Thomas | ............... | B60R 9/045 |
| | | | | 224/325 |
| 8,678,256 B2* | 3/2014 | Polewarczyk | ............... | B60R 9/045 |
| | | | | 224/321 |
| 8,978,946 B2* | 3/2015 | Gerhardt | ............... | B60R 9/052 |
| | | | | 224/314 |
| 9,440,661 B2 | 9/2016 | Burg et al. | | |
| 9,919,748 B2 | 3/2018 | Williams et al. | | |
| 10,953,807 B2 | 3/2021 | Gaither et al. | | |
| 11,017,248 B1* | 5/2021 | Toth | ............... | B60R 11/04 |
| 11,628,708 B2* | 4/2023 | Bomers | ............... | B60J 7/047 |
| | | | | 701/36 |
| 2004/0074939 A1* | 4/2004 | Aftanas | ............... | B60R 9/045 |
| | | | | 224/325 |
| 2004/0195866 A1* | 10/2004 | Fin | ............... | B60R 9/045 |
| | | | | 296/210 |
| 2007/0039985 A1* | 2/2007 | Warren | ............... | B60R 9/045 |
| | | | | 224/326 |
| 2007/0075108 A1* | 4/2007 | Stapleton | ............... | B60R 9/045 |
| | | | | 224/325 |
| 2008/0264988 A1 | 10/2008 | Thomas et al. | | |
| 2008/0272624 A1* | 11/2008 | Donicke | ............... | B60R 9/045 |
| | | | | 296/216.01 |
| 2016/0052445 A1* | 2/2016 | Huang | ............... | B60Q 1/44 |
| | | | | 362/520 |
| 2021/0197646 A1* | 7/2021 | Argento | ............... | B60H 1/00207 |
| 2022/0179066 A1* | 6/2022 | Kaufman | ............... | G01S 7/027 |

* cited by examiner

VEHICLE WITH SELECTIVELY DEPLOYABLE ROOF RAILS

TECHNICAL FIELD

This disclosure relates to a motor vehicle with selectively deployable roof rails.

BACKGROUND

Some motor vehicles include roof rails, including side rails and cross bars, which are used as mounting points for gear, such as luggage or sporting equipment.

SUMMARY

In some aspects, the techniques described herein relate to a motor vehicle assembly, including: a roof including a recess; a rail, wherein the rail is moveable between a retracted position and a deployed position, wherein the rail is at least partially within a recess of the roof in the retracted position, wherein the rail is able to connect to an accessory arranged above the roof in the deployed position; and a joint assembly, wherein the joint assembly is configured to guide movement of the rail between the retracted position and the deployed position, wherein the joint assembly includes a first foot, a second foot, and a slotted track, and wherein the first foot and the second foot are arranged at least partially within the slotted track.

In some aspects, the techniques described herein relate to an assembly, wherein the first foot, second foot, and the slotted track are configured to permit at least one of the first foot and second foot to slide within the slotted track while preventing vertical movement of the first foot and the second foot relative to the slotted track.

In some aspects, the techniques described herein relate to an assembly, wherein: the first foot includes a flared portion, the second foot includes a flared portion, and the flared portions of the first foot and second foot are within the slotted track.

In some aspects, the techniques described herein relate to an assembly, wherein the joint assembly includes a bar configured to hold a relative position of the first foot and the second foot when the rail is in the deployed position.

In some aspects, the techniques described herein relate to an assembly, wherein the joint assembly is configured such that the first foot and second foot are moveable toward and away from one another to move the rail between the retracted position and the deployed position.

In some aspects, the techniques described herein relate to an assembly, wherein the joint assembly includes: a connector attached to an underside of the rail, a first leg is pivotably connected to the first foot and the connector, and a second leg pivotably connected to the second foot and the connector.

In some aspects, the techniques described herein relate to an assembly, wherein an upper surface of the rail is substantially flush with an adjacent portion of the roof in the retracted position.

In some aspects, the techniques described herein relate to an assembly, wherein the joint assembly and rail are provided in a module configured to fit within the recess.

In some aspects, the techniques described herein relate to an assembly, further including: an actuator, wherein the joint assembly is moveable by the actuator.

In some aspects, the techniques described herein relate to an assembly, wherein the joint assembly is a first joint assembly and a second joint assembly is also configured to guide movement of the rail between the retracted position and the deployed position.

In some aspects, the techniques described herein relate to an assembly, wherein the rail includes a pad on an upper surface of the rail.

In some aspects, the techniques described herein relate to an assembly, wherein the rail includes an inductive power transfer pad configured to wirelessly transfer power from the rail to an accessory mounted to the rail.

In some aspects, the techniques described herein relate to an assembly, wherein the rail includes a wireless transceiver configured to wirelessly communicate with an accessory mounted to the rail.

In some aspects, the techniques described herein relate to an assembly, wherein the rail includes a heater.

In some aspects, the techniques described herein relate to an assembly, wherein the rail is arranged adjacent a side of the roof and a length of the rail extends parallel to a centerline of the vehicle such that the rail is configured to provide a side rail when in the deployed position.

In some aspects, the techniques described herein relate to an assembly, wherein the rail is arranged adjacent a front or rear of the roof and a length of the rail extends perpendicular to a centerline of the vehicle such that the rail is configured to provide a cross bar when in the deployed position.

In some aspects, the techniques described herein relate to an assembly, wherein a front face of the rail includes at least one light source configured to emit light when the rail is in the deployed position.

In some aspects, the techniques described herein relate to an assembly, wherein the rail is a first rail and the assembly further includes a second rail spaced-apart from the first rail, wherein the second rail is also selectively moveable between a retracted position and a deployed position.

In some aspects, the techniques described herein relate to a method, including: moving a rail vertically relative to a roof of a motor vehicle from a retracted position, in which the rail is at least partially within a recess of the roof, to a deployed position, in which the rail is able to connect to an accessory arranged above the roof, by sliding a foot of a joint assembly within a slotted track.

In some aspects, the techniques described herein relate to a method, wherein the rail is spaced-apart above the roof in the deployed position.

BRIEF DESCRIPTION OF THE DRAWINGS

In FIG. 1, the roof rails are configured as cross bars.

In FIG. 12, the roof rails are configured as side rails.

DETAILED DESCRIPTION

Figure 1:
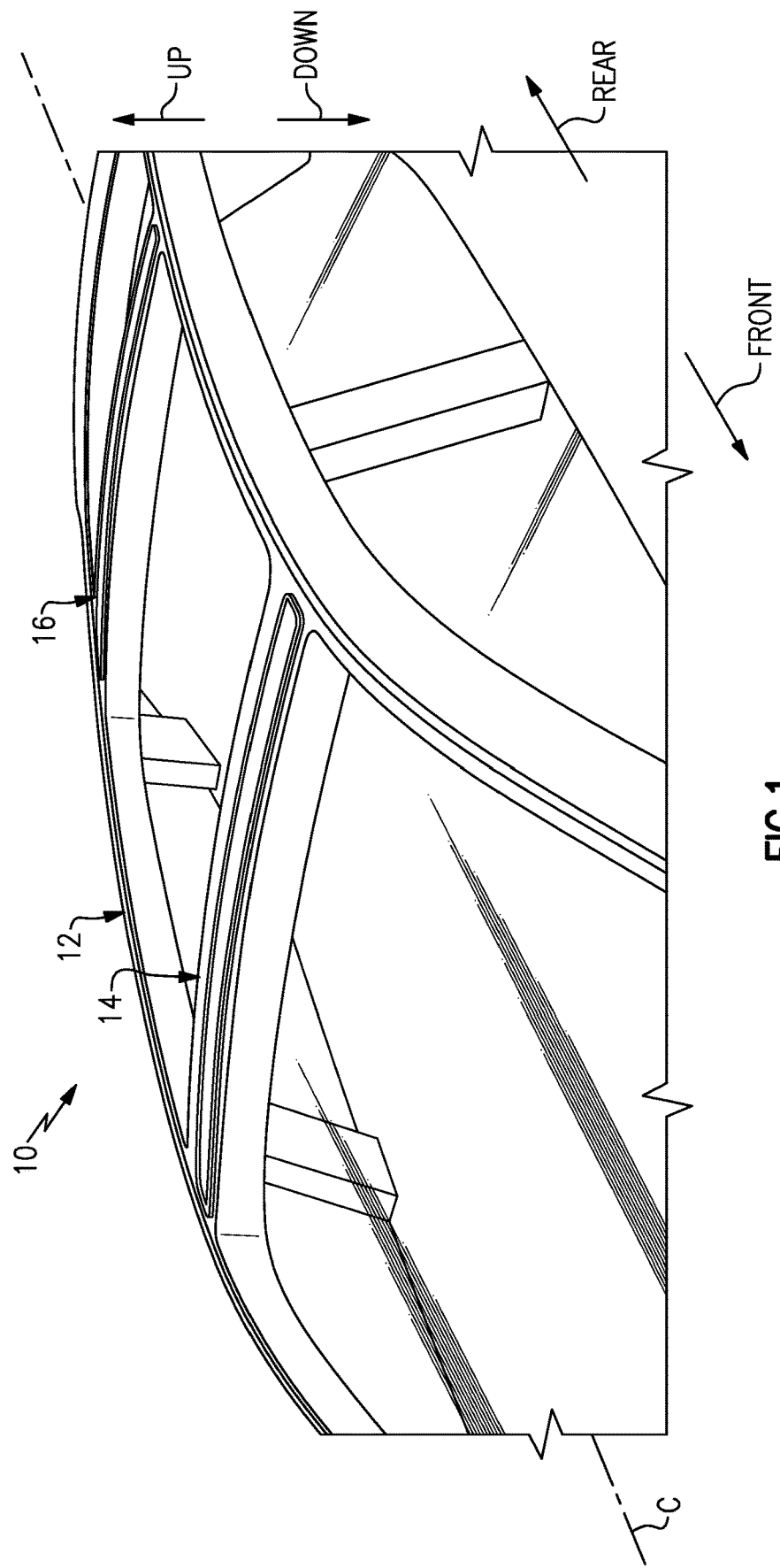
FIG. 1 is a perspective view of an example motor vehicle including roof rails in a retracted position.

This disclosure relates to a motor vehicle with selectively deployable roof rails. Referring to the drawings, FIG. 1 is a front-perspective view (the "front" and "rear" directions are labeled in FIG. 1 for reference) of a portion of a motor vehicle 10 ("vehicle 10"). Specifically, FIG. 1 shows the roof 12 of the vehicle 10. The roof 12 is the structure forming the upper covering of the vehicle 10, and is provided by metal, plastic, or glass panels, or a combination of one or more of metal, plastic, and glass panels. The roof 12 exhibits a length in a direction parallel to a centerline C of the vehicle 10 and a width in a direction perpendicular to the centerline C.

The vehicle 10 includes a rail, and more particularly a roof rail, configured to move vertically relative to the roof 12 between a retracted position and a deployed position, in this example. The vertical direction is a direction substantially normal to a ground surface upon which the vehicle 10 sits, such as dirt, grass, concrete, etc. The term "substantially" is used to account for slight variations relative to a true vertical direction, such as those brought about by tolerances and/or uneven ground surfaces, as examples. The "up" and "down" directions are vertical directions and are labeled in FIG. 1 for ease of reference.

In this example, the vehicle 10 includes first and second rails 14, 16. The first and second rails 14, 16 are spaced-apart from one another along the length of the roof 12, and are arranged adjacent a front end and a rear end of the roof 12, respectively. The first and second rails 14, 16 exhibit lengths extending in a direction perpendicular to the centerline C, and are sized such that the first and second rails 14, 16 extend generally from one side of the roof 12 to another. The first and second rails 14, 16 may be referred to as roof rails or cross bars. The first and second rails 14, 16 may also be referred to as a roof rack.

Figure 2:
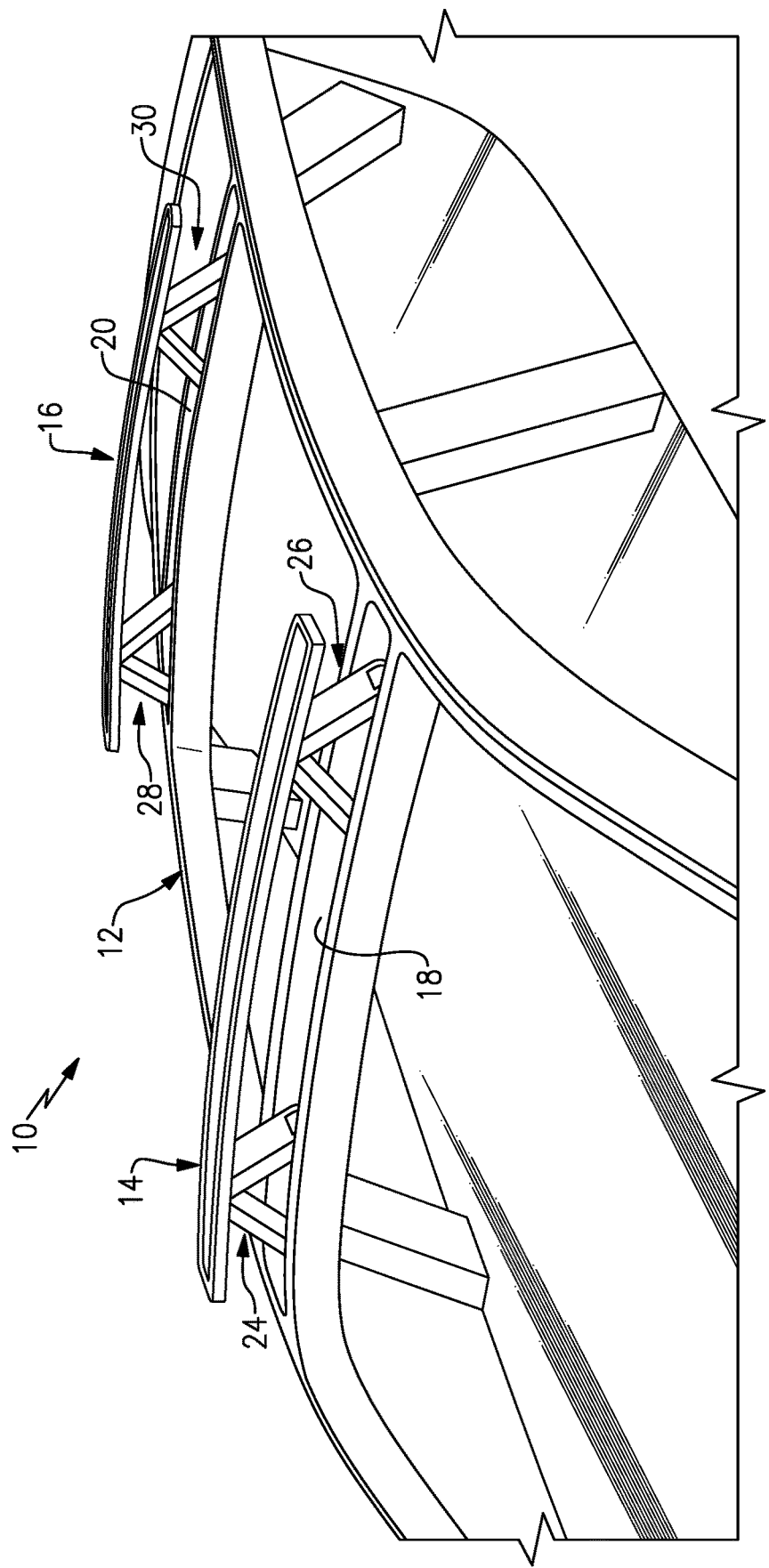
FIG. 2 is a perspective view of the example motor vehicle of FIG. 1 including roof rails in a deployed position.

The first and second rails 14, 16 are selectively deployable between a retracted position, as shown in FIG. 1, and a deployed position, as shown in FIG. 2. In this example, in the retracted position of FIG. 1, upper surfaces of the first and second rails 14, 16 are substantially flush with an adjacent portion of the roof 12. In this disclosure, substantially flush means the upper surfaces of the first and second rails 14, 16 are substantially level, and co-planar with, an adjacent portion of the roof 12.

As shown in FIG. 2, the roof 12 includes first and second recesses 18, 20 sized and shaped to receive the rails 14, 16. When the first and second roof rails 14, 16 are in the retracted position, the first and second rails 14, 16 are at least partially within the respective first and second recesses 18, 20. Again, in a particular example, in the retracted position the upper surfaces of the first and second rails 14, 16 are substantially flush with an adjacent portion of the roof 12. Permitting retraction to a substantially flush position provides a number of benefits, including increased aerodynamics.

The first and second recesses 18, 20 may correspond to, and be provided at least partially within, cross-car beams or other structures of the body of the vehicle 10. The first and second rails 14, 16 are moveable vertically relative to the roof 12 to the deployed position, in which the first and second rails 14, 16 are able to connect to and at least partially support an accessory 22, which is arranged above the roof 12, as shown in FIG. 3.

Figure 3:
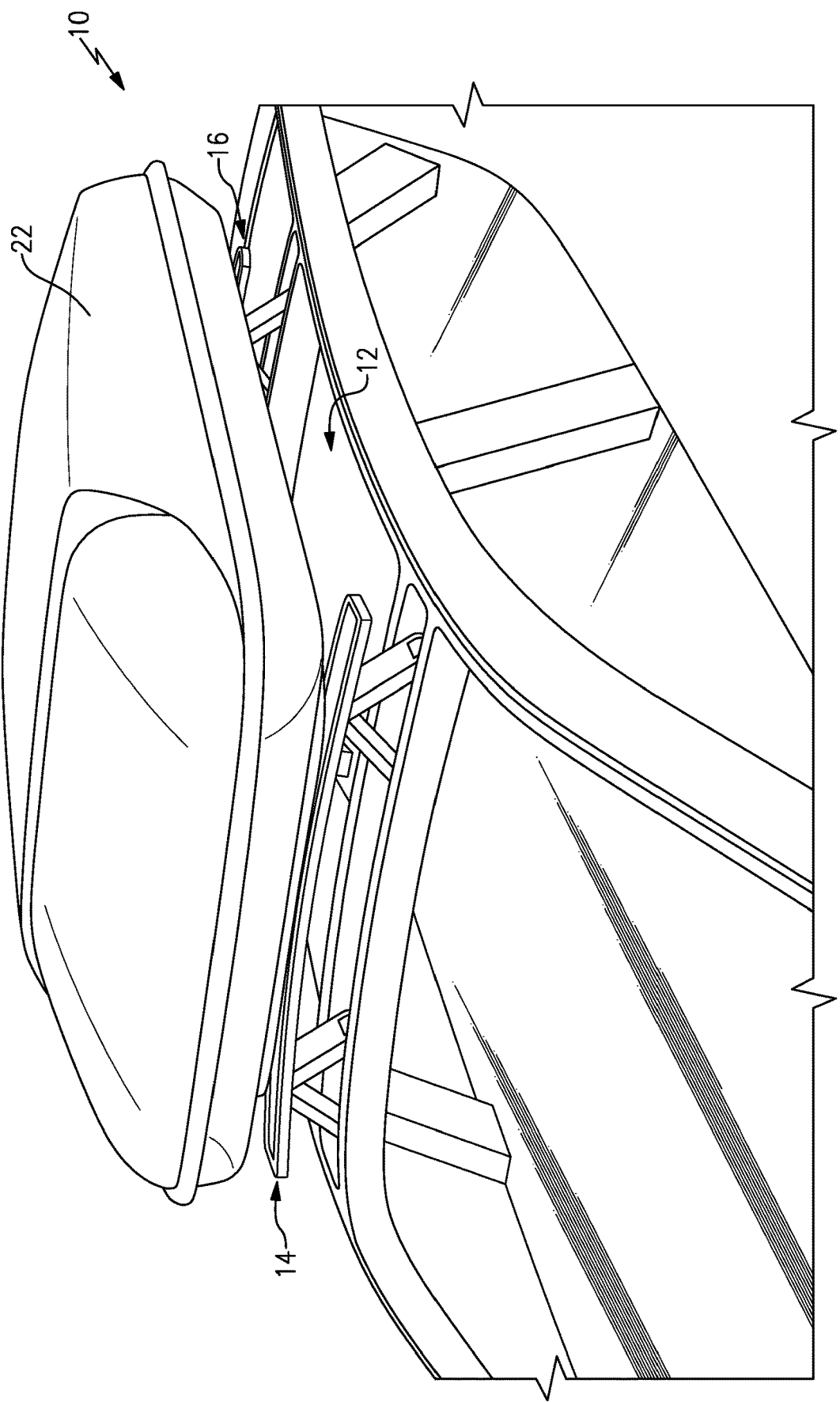
FIG. 3 is a perspective view of the example motor vehicle of FIG. 1 including roof rails in the deployed position and an accessory connected to the roof rails.

In FIG. 3, the accessory 22 is a car top carrier. The first and second rails 14, 16, however, can connect to a number of other types of accessories, including racks configured to support items such as kayaks, skis, bicycles, etc. The first and second roof rails 14, 16 can also directly connect to accessories such as kayaks, skis, bicycles, etc., without an intervening, specialized rack. The first and second rails 14, 16 can also connect to various electronic accessories, including sensors, heaters, etc., some examples of which will be discussed below.

Movement of the first and second rails 14, 16 between the retracted and deployed positions is guided by at least one joint assembly. In this example, movement of the first rail 14 is guided by a first joint assembly 24 and a second joint assembly 26, and movement of the second rail 16 is guided by a first joint assembly 28 and a second joint assembly 30.

The arrangement of the first joint assembly 24 relative to the first rail 14 will now be described. It should be understood that the joint assemblies 26, 28, 30 are arranged similarly relative to the corresponding one of the first and second rails 14, 16.

Figure 4:
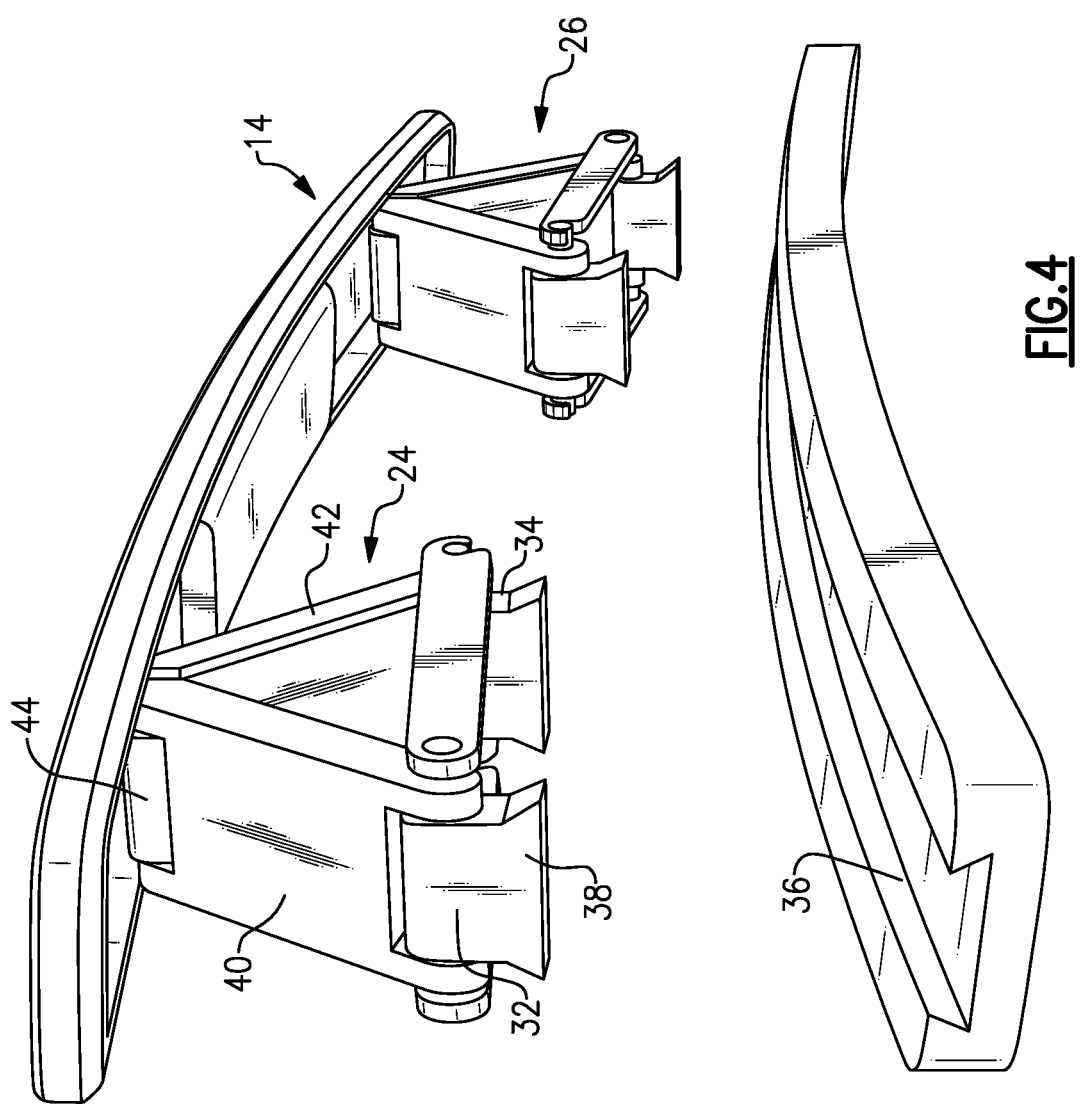
FIG. 4 is a side-perspective view of a roof rail, a first joint assembly, and a second joint assembly relative to a slotted track.
Figure 5:
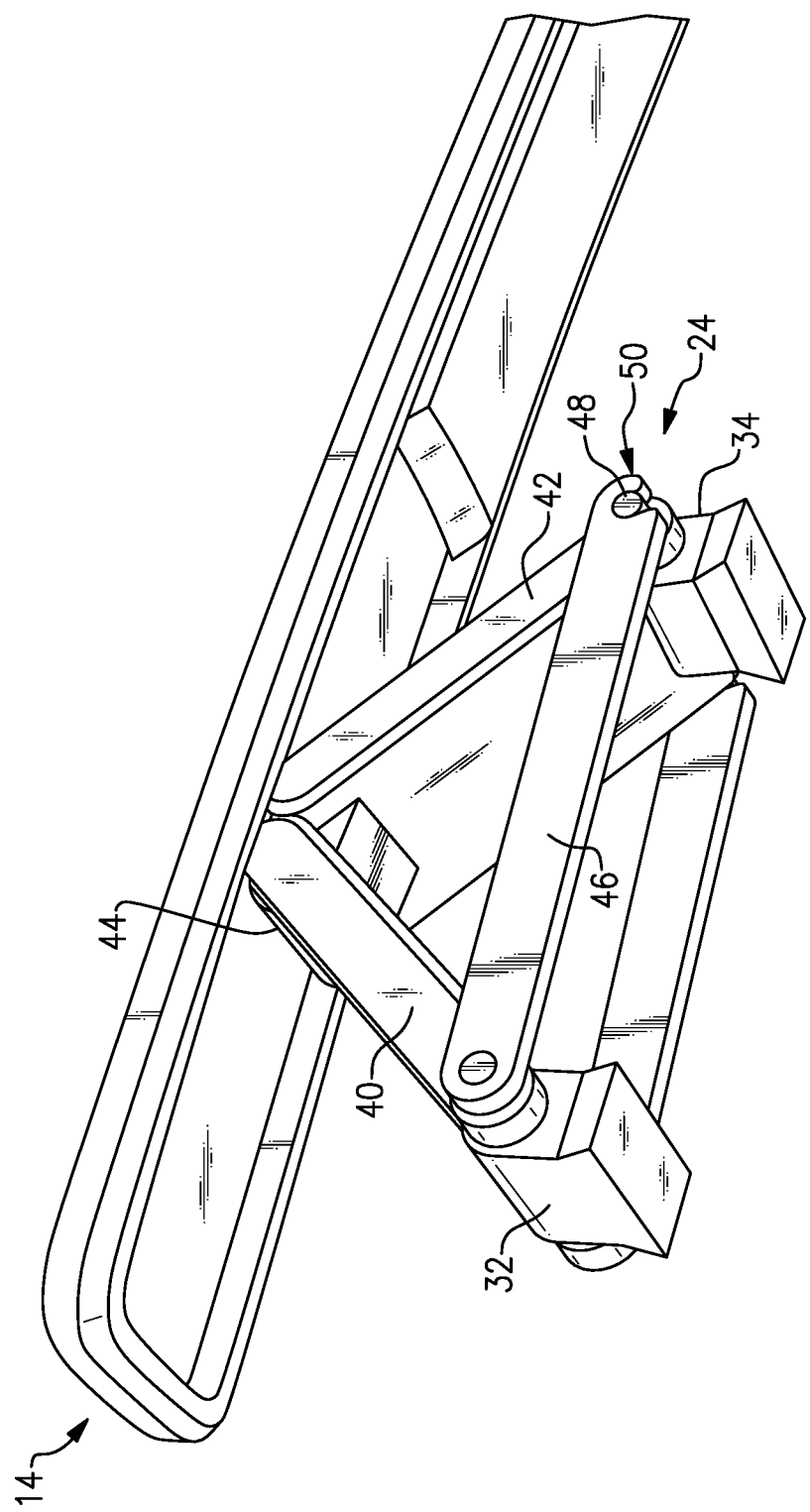
FIG. 5 is a bottom-perspective view of a portion of the roof rail including the first joint assembly.

With reference to FIGS. 4 and 5, the first joint assembly 24 includes a first foot 32 and a second foot 34. The first foot 32 and second foot 34 are arranged within the recess 18, and are configured to slide along a slotted track 36 arranged within the recess 18. The first foot 32 includes a flared bottom portion 38 configured to fit within the slotted track 36. The second foot 34 includes a similar arrangement. The slotted track 36 is sized and shaped to receive the first foot 32 and the second foot 34, specifically the flared bottom portions thereof, such the first foot 32 and second foot 34 can slide along a length of the slotted track 36 while preventing vertical movement of the first foot and second foot 34 relative to the slotted track 36. The slotted track 36 is a dovetail slot in one example. The slotted track 36 may be integrally formed with the recess 18 or formed separately and attached to the recess 18.

In an example, both of the first foot 32 and the second foot 34 are slidable within the slotted track 36. In another example, only one of the first foot 32 and the second foot 34 is slidable within the slotted track 36, with the non-slidable foot being fixed. Regardless, at least one of the first foot 32 and the second foot 34 is able to slide relative to the another within the slotted track 36 to raise and lower the first rail 14 between the deployed and retracted positions. Specifically, as the first foot 32 and second foot 34 move further away from one another, the first rail 14 is lowered toward the retracted position, and as the first foot 32 and second foot 34 move closer toward one another, the first rail 14 is raised toward the deployed position.

The joint assembly 24 further includes a first leg 40 connecting the first foot 32 to the first rail 14 and a second leg 42 connecting the second foot 34 to the first rail 14. In this example, an underside of the first rail 14 includes a connector 44 configured to connect to the first and second legs 40, 42. The first leg 40 is pivotably attached to both the first foot 32 and the connector 44. Likewise, the second leg 42 is pivotably attached to both the second foot 34 and the connector 44.

Again, the joint assembly 24 is configured such that the first foot 32 and second foot 34 are moveable toward and away from one another to move the rail between the deployed position and the retracted position, respectively. Movement of the joint assembly 24, and in turn the first rail 14, may be accomplished manually. When configured for manual movements, the joint assembly 24 may be configured as a "pop up" assembly in which a downward force on the first rail 14, when the first rail 14 is in the retracted position, will cause the first rail 14 to move upward to the deployed position.

One or both of the joint assemblies 24, 26 could be moveable automatically using a powered assembly that includes one or more powered actuators, gears, linkages, etc. In that case, a user could initiate movements of the first rail 14 and second rail 16 by initiating a command on a keyfob, on mobile device of the user, by a button on an exterior of the vehicle 10, and/or by a user interface in a passenger cabin.

When the joint assembly 24 includes a powered actuator, the powered actuator can hold the joint assembly 24 in place in the deployed and retracted positions. Alternatively or additionally, the joint assembly 24 can include a bar 46 (FIG. 5) configured to hold a position of the first foot 32 relative to the second foot 34 when the first rail 14 is in the deployed position. In this example, the bar 46 projects from the first foot 32 in a direction toward the second foot 34 and is configured to selectively engage a pin 48 of the second foot 34 when the first rail 14 is in the deployed position. An end of the bar 46 opposite the first foot 32 is configured as a detent, such as a hook 50 in this example, and is configured to receive the pin 48 when the first rail 14 is in the deployed position. The bar 46 may be biased, by a spring for example, in a downward direction such that the hook 50 grasps the pin 48 as the pin 48 slides toward the hook 50.

Figure 6:
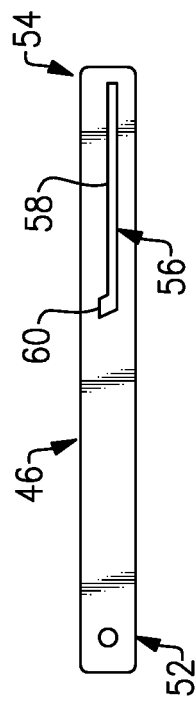
FIG. 6 is a view of an example bar.
Figure 7:
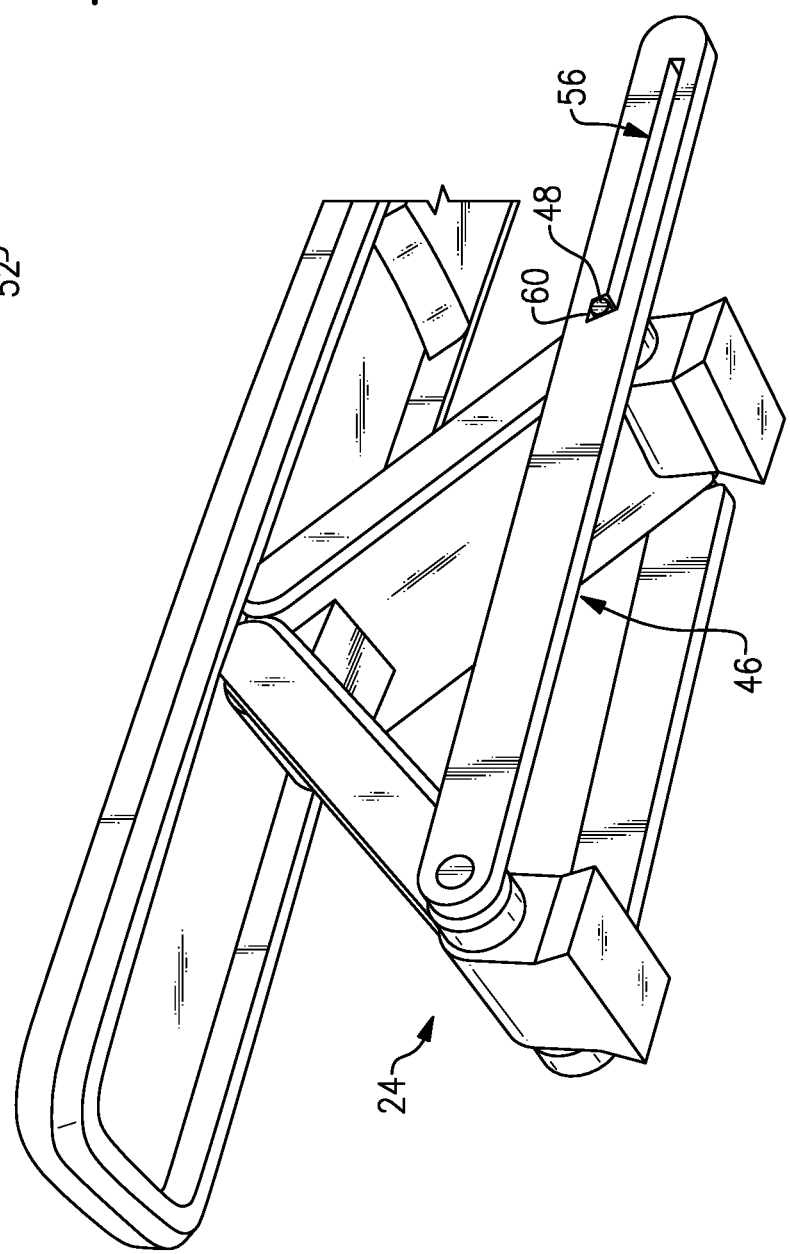
FIG. 7 is a bottom-perspective view of a portion of the roof rail including a version of the first joint assembly including the example bar of FIG. 6.

In an alternate embodiment, shown in FIGS. 6 and 7, the bar 46 includes a first end section 52 mounted to the first foot 32 and a second end section 54. Adjacent the second end section 54, the bar 46 includes a slot 56 having a horizontal portion 58 and a vertical portion 60. The pin 48 is configured to slide within the horizontal portion 58 during all conditions except when the first rail 14 is in the deployed position. When the first rail 14 is in the deployed position, the pin 48 enters the vertical portion 60 of the slot 56, as shown in FIG. 7, which helps maintain the first rail 14 in the deployed position.

Figure 8:
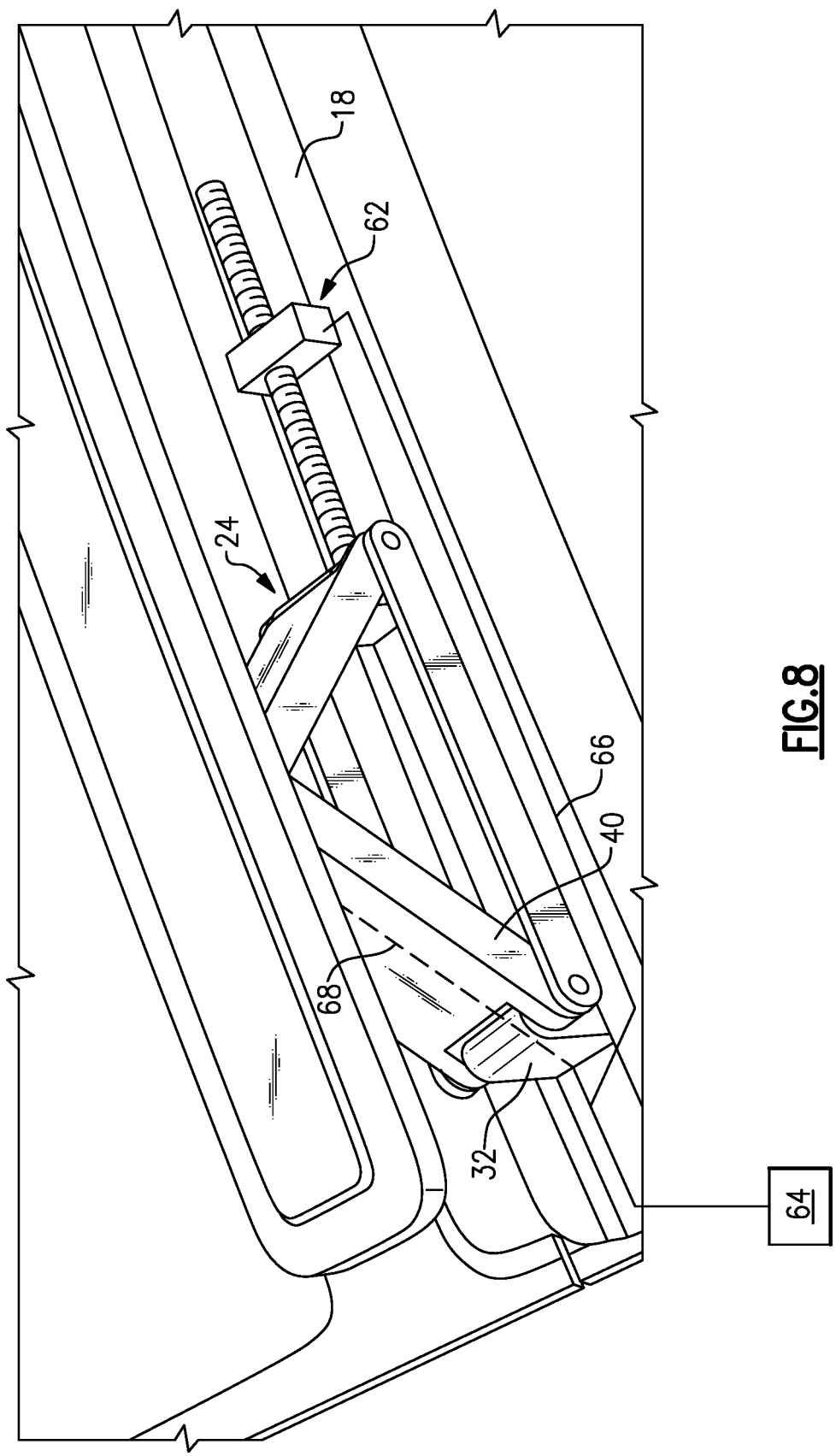
FIG. 8 is a top-perspective view of a portion of the roof rail and the first joint assembly relative to an actuator.

An example powered assembly is shown somewhat schematically in FIG. 8. In FIG. 8, the powered assembly includes an actuator 62. The joint assembly 24 is moveable by the actuator 62. In particular, in this example, the actuator 62 is a linear actuator, such as a ball screw actuator, configured to urge the first foot 32 and/or the second foot 34 to slide along the slotted track 36 in response to commands from a controller 64. While an example actuator 62 is shown in FIG. 8, this disclosure extends to other types of actuators. It should be understood that the joint assembly 26 could also interface with a separate actuator configured similar to actuator 62, or may optionally not interface with a powered actuator. The second rail 16 may also include one or more powered actuators, and movements of the first rail 14 and second rail 16 may be synchronized.

The controller 64 may be part of an overall vehicle control module, such as a vehicle system controller (VSC), or could alternatively be a stand-alone controller separate from the VSC. The controller 64 may be programmed with executable instructions for interfacing with and operating the various components of the vehicle 10. The controller 64 additionally includes a processing unit and non-transitory memory for executing the various control strategies and modes of the vehicle 10.

In FIG. 8, various electrical lines are shown. A first electrical line 66 extends from the controller 64 to the actuator 62. A second electrical line 68 extends from the controller 64, through the first foot 32 and the first leg 40, to power one or more accessories of the first rail 14. Various optional electronic accessories that may be supported by and/or connected to the first rail 14 will now be described.

Figure 9:
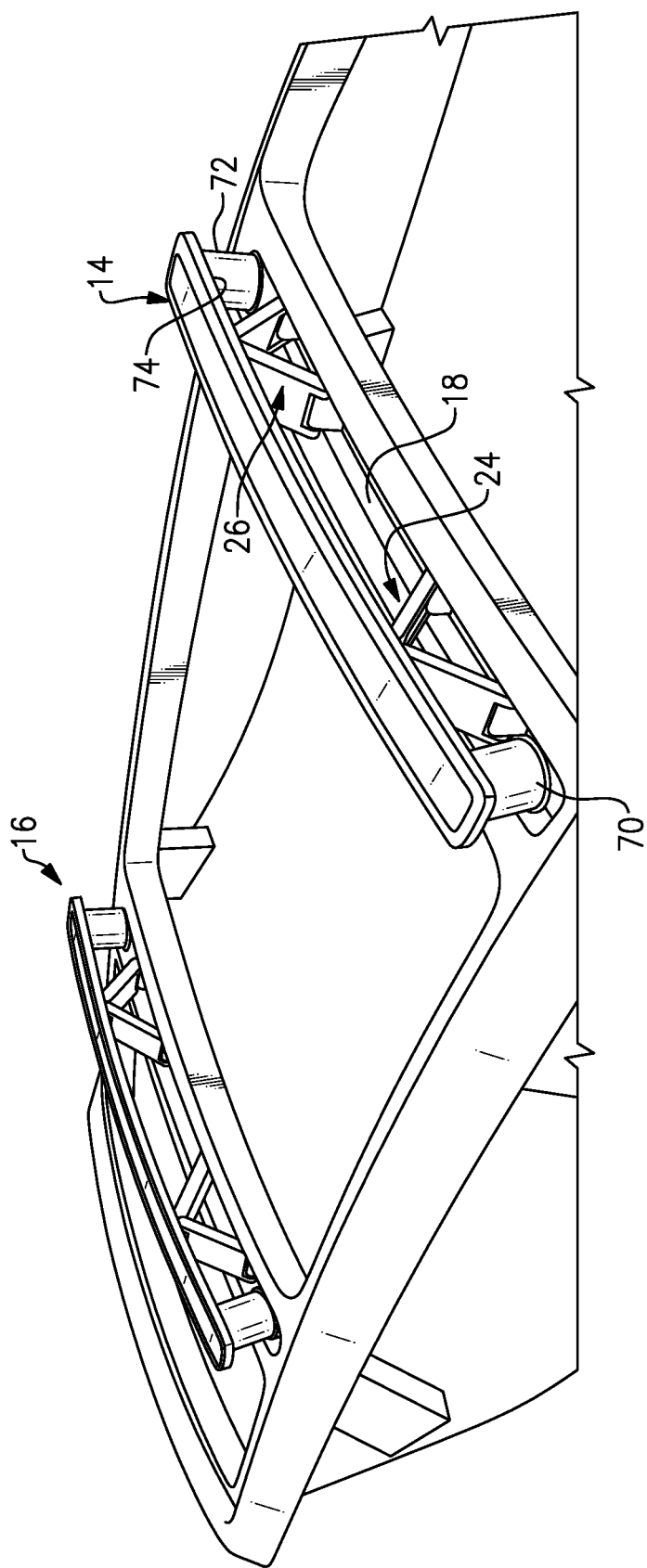
FIG. 9 is a perspective view of the example motor vehicle including roof rails in a deployed position and sensors connected to the roof rails.

With reference to FIG. 9, the first rail 14 includes at least one sensor mounted thereto. In this specific example, the first rail 14 includes two sensors 70, 72 mounted to the underside 74 of the first rail 14 and configured such that the sensors 70, 72 are usable when the first rail 14 is in the deployed position. The sensors 70, 72 are configured to fit in the recess 18 when the first rail 14 is in the retracted position. The sensors 70, 72 are arranged outside the first and second joint assemblies 24, 26 in this example. The sensors 70, 72 are sensors of a self-driving system (SDS) of the vehicle 10. In an example, the sensors 70, 72 are light detection and ranging (lidar) sensors. Providing the sensors 70, 72 on the first rail 14 permits one to securely store the sensors 70, 72 when they are not in use, such as when the vehicle 10 is parked. The second rail 16 may also include one or more sensors, and in this example also includes two sensors of with the SDS of the vehicle 10.

In an example, the first rail 14 includes a pad 76 (FIG. 10) on an upper surface thereof. The pad 76 may be made of a rubber or polymer material, as examples. Further, the underside 74 of the first rail 14 may include recesses and/or cutouts configured to receive at least a portion of the first and second joint assemblies 24, 26 to facilitate compact packaging.

Figure 10:
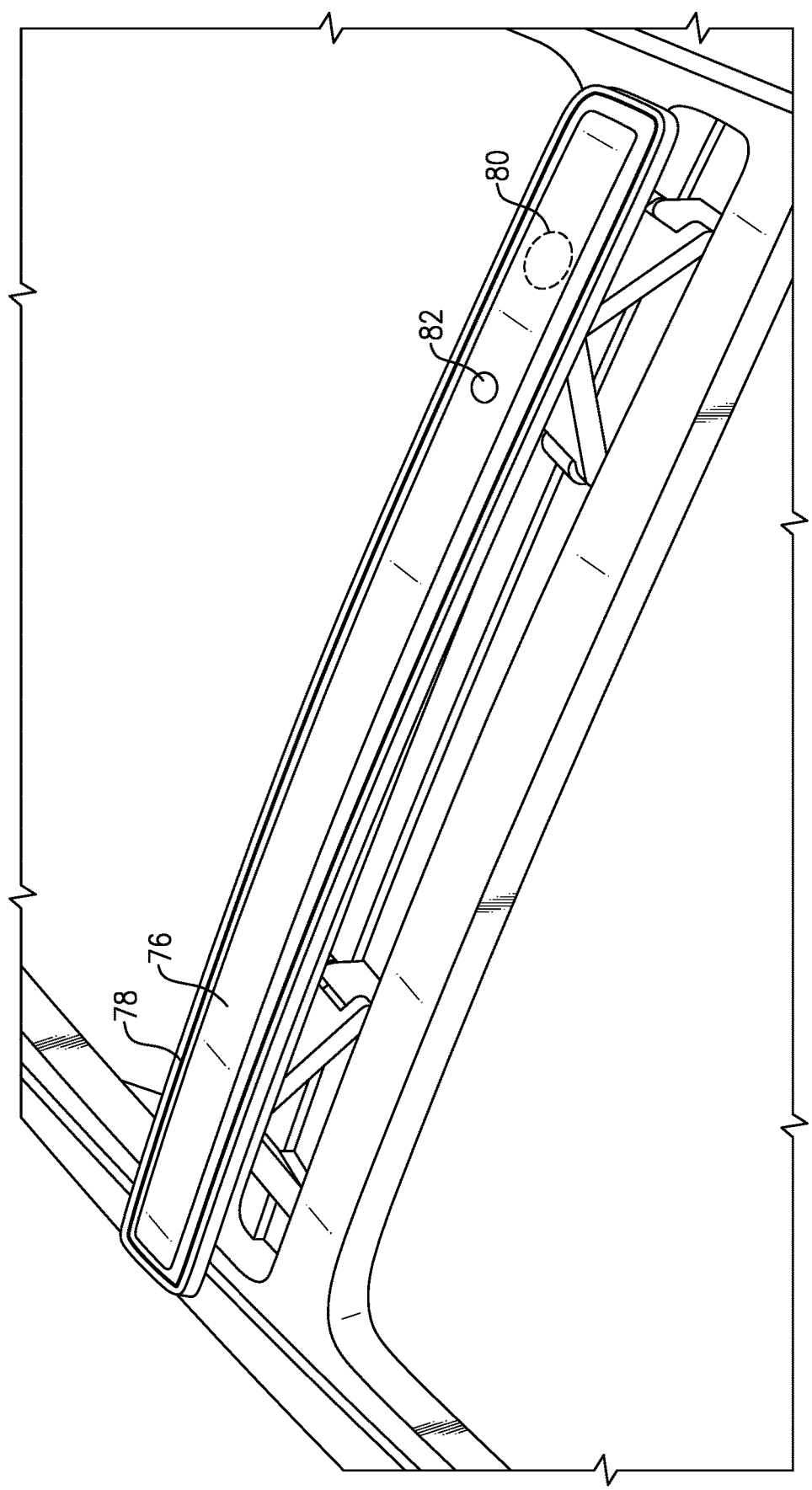
FIG. 10 is a top-perspective view of a roof rail with various electronic accessories.
Figure 11:
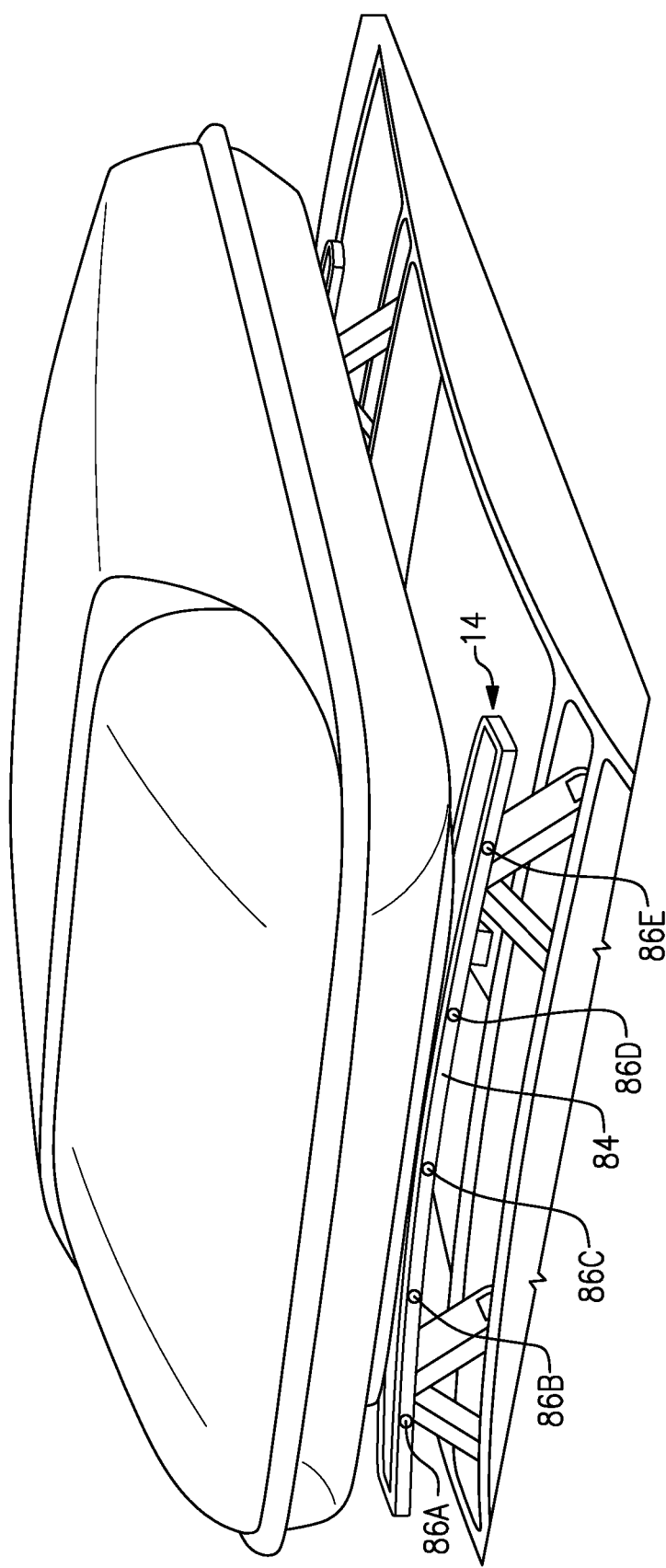
FIG. 11 is a perspective view of the example motor vehicle including roof rails in a deployed position, with an accessory connected to the roof rails, and with a plurality of light sources incorporated into one of the roof rails.

With continued reference to FIG. 10, the first rail 14 may optionally include one or more of the following electronic accessories. In FIG. 10, the first rail 14 includes a heater 78 provided by a resistive wire that follows a perimeter of the first rail 14, and in this example circumscribes the pad 76. The first rail 14 may also include an inductive power transfer pad 80, such as a Qi wireless charger, configured to wirelessly transfer power from the first rail 14 to an accessory mounted to the first rail 14. The inductive power transfer pad 80 may be integrated into the pad 76. The first rail 14 may also include a wireless transceiver 82 configured to wirelessly communicate with an accessory mounted to the first rail 14. The transceiver 82 may also include or be associated with a light configured to illuminate a particular color to indicate a wireless connection with an accessory has been established. Further, the first rail 14 may include one or more light sources configured to emit light indicative of a load on the first rail 14. In FIG. 11, for example, a front face 84 of the first rail 14 includes five light sources 86A-86E spaced-apart from one another and configured to illuminate one of a variety of colors to indicate a status of a load on the first rail 14. For instance, the light sources 86A-86E could all illuminate green to indicate a load is below a threshold, yellow to indicate the load is approaching or near a threshold, and red to indicate the load is above the threshold. The light sources 86A-86E may alternatively or additionally be operable in a mode in which the light sources 86A-86E are configured to illuminate to indicate whether a load on the first rail 14 is centered. For instance, if light sources 86A and 86B illuminate a red color and light sources 86C-86E illuminate a green color, the user can discern that the load is off-centered in the left-hand direction (with reference to FIG. 11) and that the load should be shifted in the right-hand direction. The controller 64 is operable to command the light sources 86A-86E in either mode, and may be in communication with one or more strain gauges, for example, which may be embedded into the first rail 14, to determine the various load(s) on the first and second rails 14, 16. Any of the electronics mentioned above may alternatively or additionally be incorporated into the second rail 16.

Figure 12:
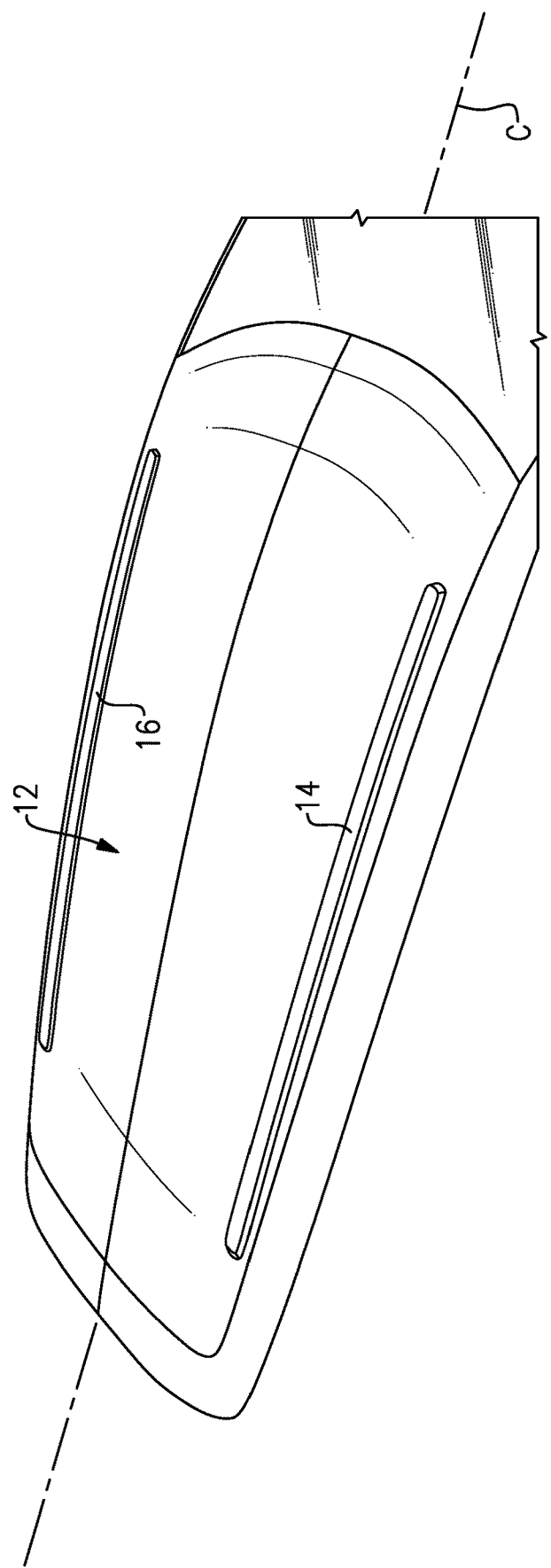
FIG. 12 is a perspective view of another example motor vehicle including roof rails in a retracted position.
Figure 13:
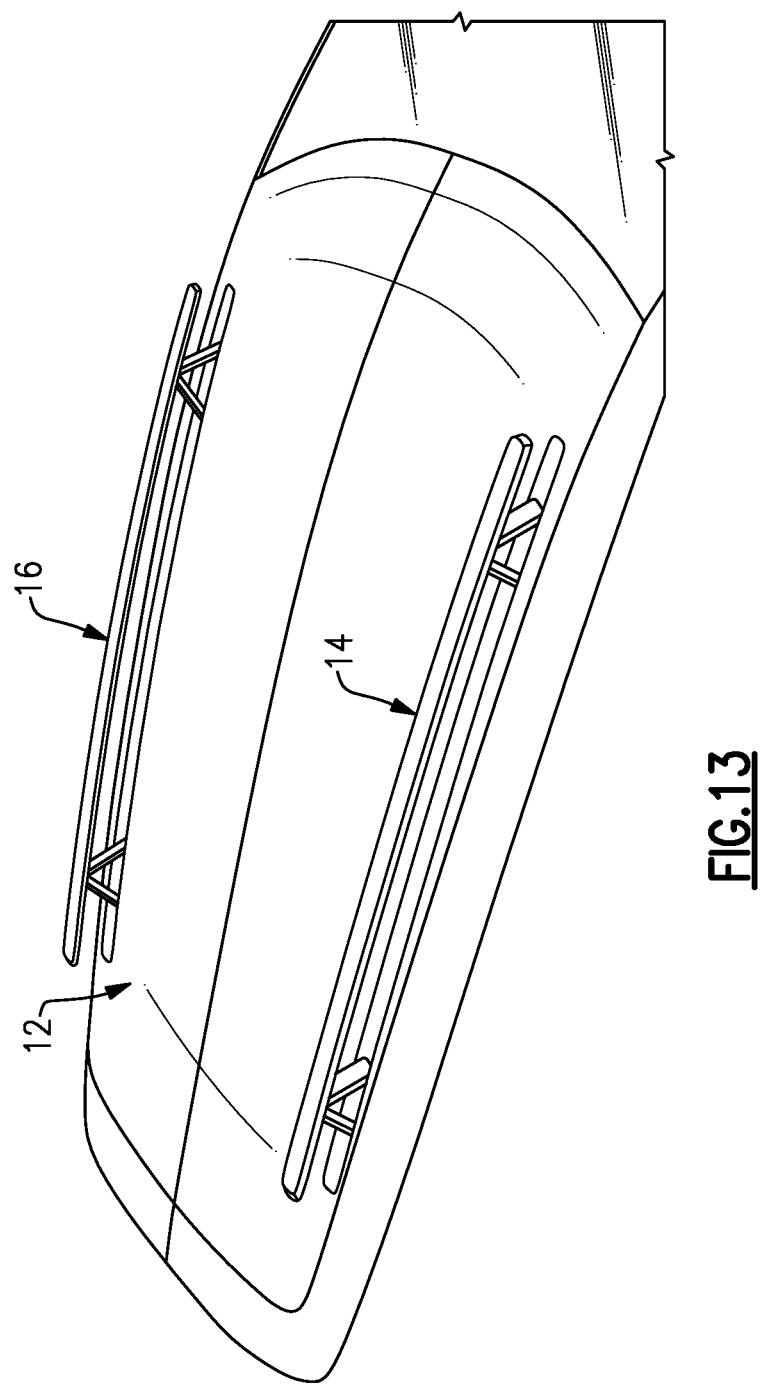
FIG. 13 is a perspective view of the example motor vehicle of FIG. 12 including roof rails in a deployed position.
Figure 14:
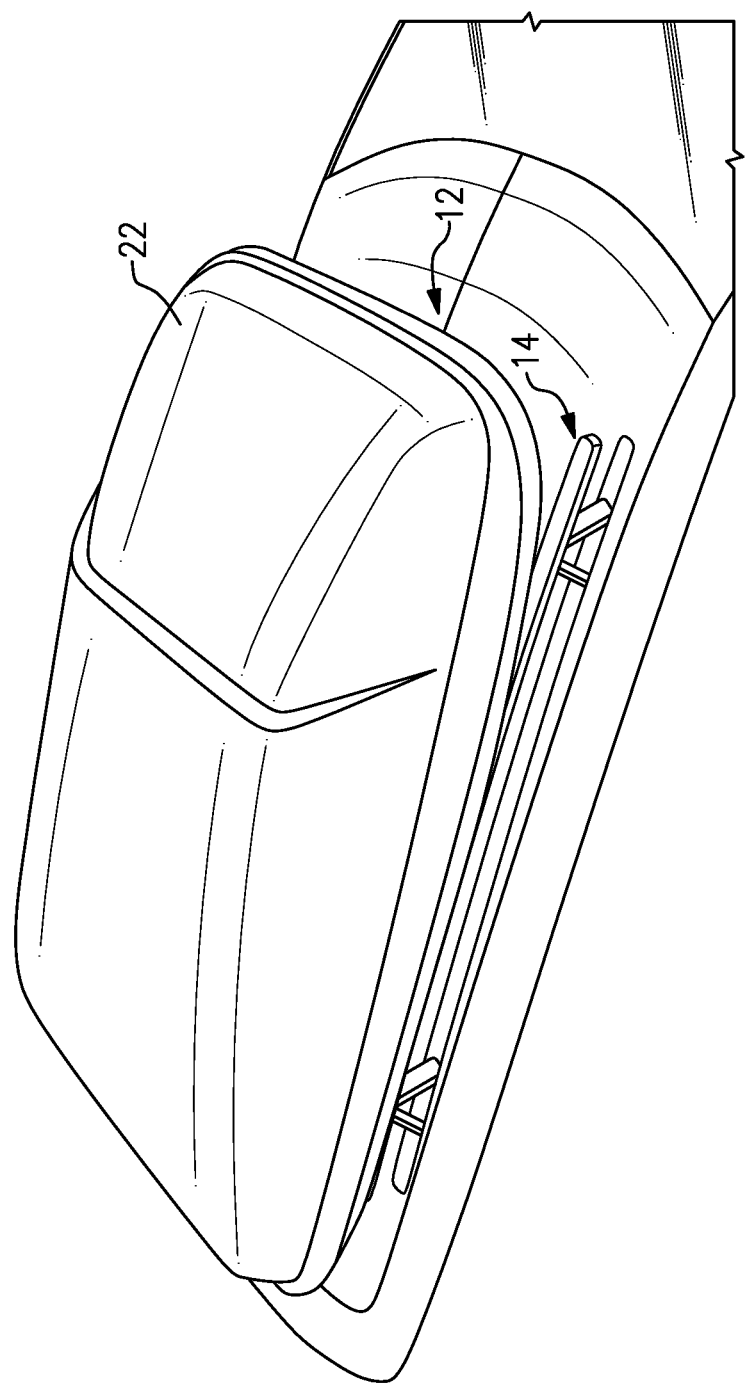
FIG. 14 is a perspective view of the example motor vehicle of FIG. 12 including roof rails in the deployed position and an accessory connected to the roof rails.

While the first and second rails 14, 16 extend perpendicular to the vehicle centerline C in FIGS. 1-11, the first and second rails 14, 16 could be configured such that lengths of the first and second rails 14, 16 are arranged parallel to the centerline C and such that the first and second rails 14, 16 extend along sides of the roof 12, as shown in FIGS. 12-14. The first and second rails 14, 16 are moveable in substantially the same manner as described above and are configured to support an accessory 22 (FIG. 14) when in the deployed position (FIG. 13), as above. In FIGS. 12-14, the first and second rails 14, are sized such that the first and second rails 14, 16 extend generally from one end of the roof 12 to another. The first and second rails 14, 16 may be referred to as roof rails, side rails, or a roof rack.

Figure 15:
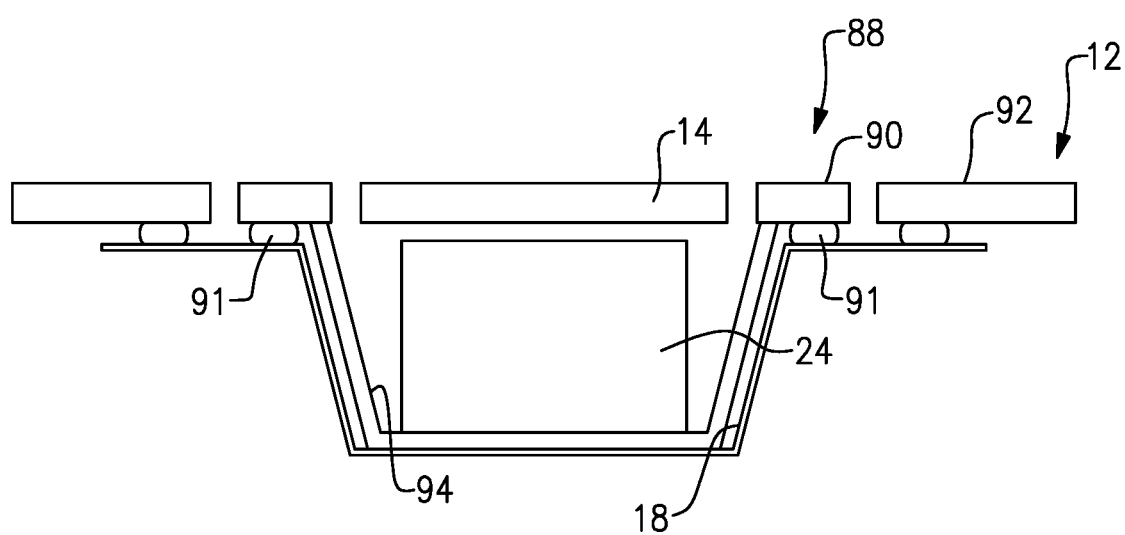
FIG. 15 is a side view of an example module mounted relative to the roof of an example motor vehicle.

In any of the above embodiments, the first and second rails 14, 16, and the corresponding components such as the corresponding joint assemblies, can be provided as a module that can be installed into recesses within the roof 12. FIG. 15 illustrates an example module 88 somewhat schematically from a side view. The module 88 contains the first rail 14 and the first and second joint assemblies 24, 26 (only the first joint assembly 24 is visible in FIG. 15). The first rail 14 and first and second joint assemblies 24, 26 are mounted to a bezel 90 which surrounds the recess 18 and sits flush with the adjacent portion 92 of the roof 12. An underside of the bezel 90 includes one or more gaskets or seals 91 configured to resist water ingress. A tray 94 extends beneath the bezel 90 and supports the first and second joint assemblies 24, 26 from below. The slotted track 36 (not shown) is mounted to or provided by the tray 94. The tray 94 is sized and so as to substantially correspond to the size and shape of the recess 18 in this example. Further, the recess 18 and tray 94 are both sized and shaped such that a top surface of the first rail 14 is substantially flush with the adjacent portion 92 of the roof 12 when the first rail 14 is in the retracted position, as shown in FIG. 15. The module 88 includes electrical wiring and connectors configured to interface with the vehicle 10. Providing the first rail 14 as a module 88 increases the ease of installation and customization of the vehicle 10. Specifically, if a user does not desire a deployable roof rail, the module 88 can be removed and another accessory could be mounted relative to the recess 18.

Directional terms such as "upward," "above," "downward," "under," "below," "side," "inside," "outside," "horizontal," etc., are used herein with reference to the normal operational attitude of a motor vehicle. It should be understood that terms such as "slightly," "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A motor vehicle assembly, comprising:
   a roof including a recess;
   a rail, wherein the rail is moveable between a retracted position and a deployed position, wherein the rail is at least partially within a recess of the roof in the retracted position, wherein the rail is able to connect to an accessory arranged above the roof in the deployed position; and
   a joint assembly, wherein the joint assembly is configured to guide movement of the rail between the retracted position and the deployed position, wherein the joint assembly includes a first foot, a second foot, and a slotted track, wherein the first foot and the second foot are arranged at least partially within the slotted track, and wherein the first foot, the second foot, and the slotted track are arranged within the recess,
   wherein the first foot, second foot, and the slotted track are configured to permit at least one of the first foot and second foot to slide within the slotted track while preventing vertical movement of the first foot and the second foot relative to the slotted track,
   wherein the first foot includes a flared portion,
   wherein the second foot includes a flared portion, and
   wherein the flared portions of the first foot and second foot are within the slotted track.

2. The assembly as recited in claim 1, wherein the joint assembly is configured such that the first foot and second foot are moveable toward and away from one another to move the rail between the retracted position and the deployed position.

3. The assembly as recited in claim 1, wherein the joint assembly includes:
   a connector attached to an underside of the rail,
   a first leg pivotably connected to the first foot and the connector, and
   a second leg pivotably connected to the second foot and the connector.

4. The assembly as recited in claim 1, wherein an upper surface of the rail is substantially flush with an adjacent portion of the roof in the retracted position.

5. The assembly as recited in claim 4, wherein the joint assembly and rail are provided in a module configured to fit within the recess.

6. The assembly as recited in claim 1, further comprising:
   an actuator, wherein the joint assembly is moveable by the actuator.

7. The assembly as recited in claim 1, wherein the joint assembly is a first joint assembly and a second joint assembly is also configured to guide movement of the rail between the retracted position and the deployed position.

8. The assembly as recited in claim 1, wherein the rail includes a pad on an upper surface of the rail.

9. The assembly as recited in claim 1, wherein the rail includes an inductive power transfer pad configured to wirelessly transfer power from the rail to an accessory mounted to the rail.

10. The assembly as recited in claim 1, wherein the rail includes a wireless transceiver configured to wirelessly communicate with an accessory mounted to the rail.

11. The assembly as recited in claim 1, wherein the rail includes a heater.

12. The assembly as recited in claim 1, wherein the rail is a first rail and the assembly further includes a second rail spaced-apart from the first rail, wherein the second rail is also selectively moveable between a retracted position and a deployed position.

13. The assembly as recited in claim 3, wherein, as the rail moves between the retracted position and the deployed position, the first and second legs pivot relative to the connector without sliding along the rail.

* * * * *